United States Patent [19]
Natho et al.

[11] 3,823,911
[45] July 16, 1974

[54] SEATS FOR GATE VALVES
[75] Inventors: Paul J. Natho; William L. Whaley, both of Houston, Tex.
[73] Assignee: ACF Industries, Incorporated, New York, N.Y.
[22] Filed: June 11, 1973
[21] Appl. No.: 368,920

[52] U.S. Cl............................... 251/167, 251/196
[51] Int. Cl............................................ F16k 25/00
[58] Field of Search............ 251/167, 168, 195, 196

[56] References Cited
UNITED STATES PATENTS
| | | | |
|---|---|---|---|
| 2,583,512 | 1/1952 | Laurent | 251/196 |
| 2,778,600 | 1/1957 | Bredtsohneider | 251/196 |
| 2,906,491 | 9/1959 | Young | 251/167 |
| 2,977,086 | 3/1961 | Heiner | 251/167 |

Primary Examiner—Harold W. Weakley
Attorney, Agent, or Firm—Eugene N. Riddle

[57] ABSTRACT

A gate valve having a gate assembly of the expanding type employing a gate element and segment with adjacent wedge surfaces to expand the gate mechanism in both open and closed positions. Opposed floating seat elements are mounted within recesses of the valve body on opposite sides of the gate structure and spacers are connected to the opposed seat elements along opposed sides of the gate assembly to maintain a predetermined spacing between the seat elements but yet to permit floating of the seat elements. A predetermined minimum clearance between the seat elements and the gate assembly is maintained at all times by the spacers.

5 Claims, 4 Drawing Figures

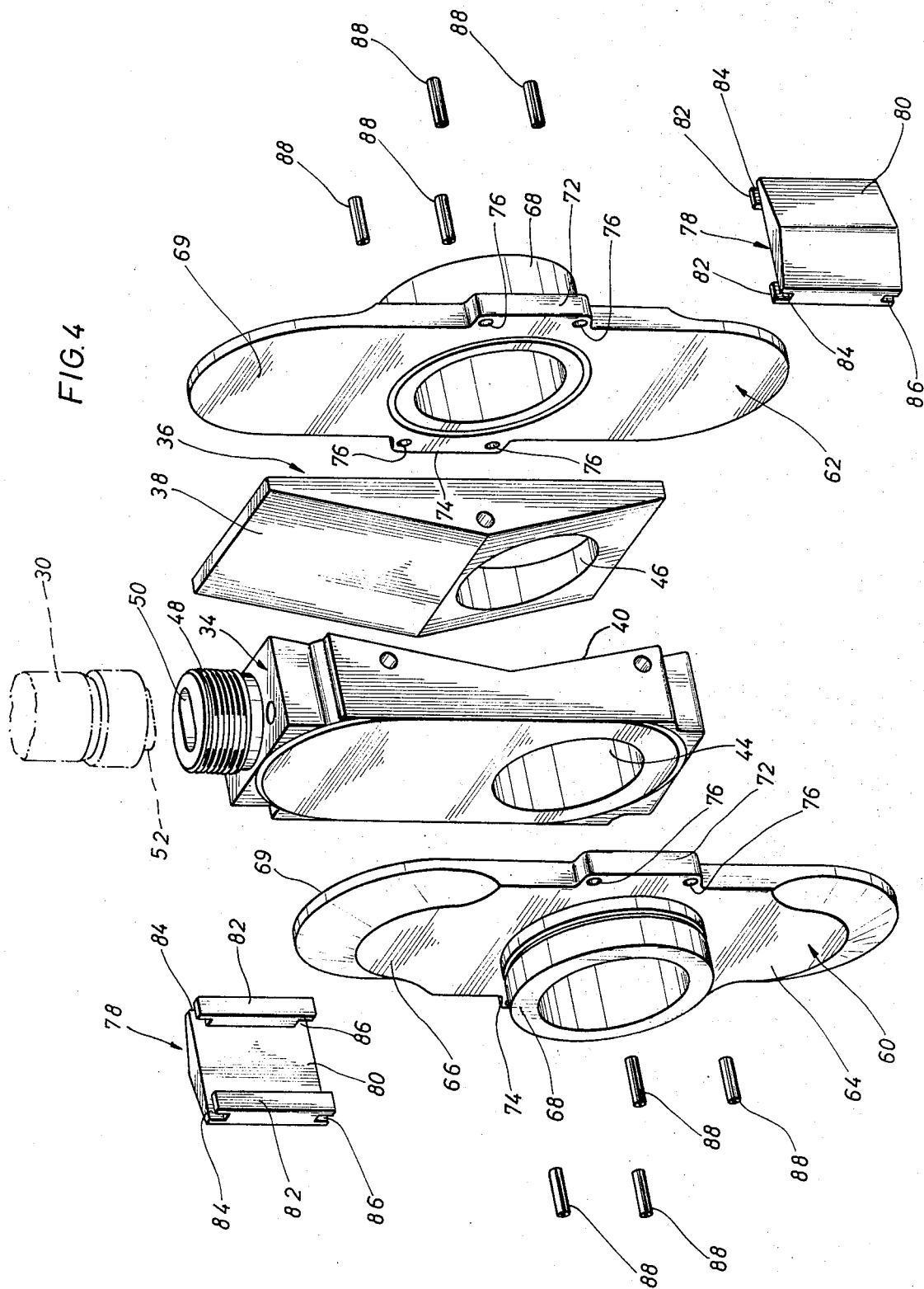

SEATS FOR GATE VALVES

BACKGROUND OF THE INVENTION

The field of art to which the invention pertains is to a gate valve having a reciprocating valve assembly moving transversely of the flow passage. The valve assembly has expanding gate elements and floating seats are positioned on opposed sides of the expanding gate elements.

In the construction of gate valves of the expanding type as provided heretofore, recesses are provided in the valve body about the flow passage of each side of the gate assembly. Seat elements of a ring-like configuration are disposed within the recesses and their inner end faces are positioned in sliding contact with the gate element and segment forming the gate assembly. The recesses are usually exposed to the fluid pressure of the adjacent flow passage so that fluid under pressure may enter the recesses behind the seat elements to cause the seat elements to move or "float" toward the gate element and segment forming the gate assembly.

In the event the upstream seat element is subjected to a high differential pressure in which the fluid pressure in the adjacent flow passage is substantially higher than the fluid pressure in the valve body then the upstream seat element will "float" or move toward the gate assembly especially in the collapsed position of the gate assembly thereby to cause sticking or binding of the gate assembly between open and closed positions. The gate assembly is in a collapsed position between the fully open and fully closed positions of the gate assembly and such binding occurs in the collapsed position.

Of course, it is possible to provide a gate valve structure in which the seats are fixed and are not permitted to "float" or move within their recesses. However, an effective seal must be provided between the parts of the gate assembly and the seats and leakage often occurs if the seats are not permitted to float or move with the gate assembly.

SUMMARY OF THE INVENTION

The present invention is directed to a gate valve structure having a gate assembly of the expanding type employing a gate element and segment with adjacent wedge surfaces to expand the gate mechanism in both open and closed positions. Opposed floating seat elements are mounted within recesses of the valve body on opposite sides of the gate assembly. Spacer blocks extend between the floating seat elements along opposite sides of the gate assembly. The spacer blocks are connected to the floating seat elements and maintain a minimum clearance between the gate assembly and the seat elements. The maintaining of such a minimum clearance prevents the seat elements from binding against the gate assembly in its collapsed position such as might occur when the upstream seat is subjected to a high differential pressure. The width of the spacer blocks is slightly greater than the thickness of the gate assembly, such as around 0.010 inch greater, and thus an operating clearance for the gate assembly is provided at all times. The seat elements are mounted so that relative movement between the spacer blocks and seat elements is provided, and thus the seat elements may move a limited amount away from the spacer blocks which may be desirable in some instances for establishing adequate seals for the gate assembly. The spacer blocks are loosely carried by the seat elements by pins on the seat elements fitting in upper and lower slots on the spacer blocks and may be easily assembled in place within the valve body between the seat elements.

BRIEF DESCRIPTION OF THE DRAWINGS

In the accompanying drawings, in which one of various possible embodiments of the invention is illustrated:

FIG. 4 is an exploded view of the gate assembly including the seat elements and spacer means between the seat elements.

Figure 1:
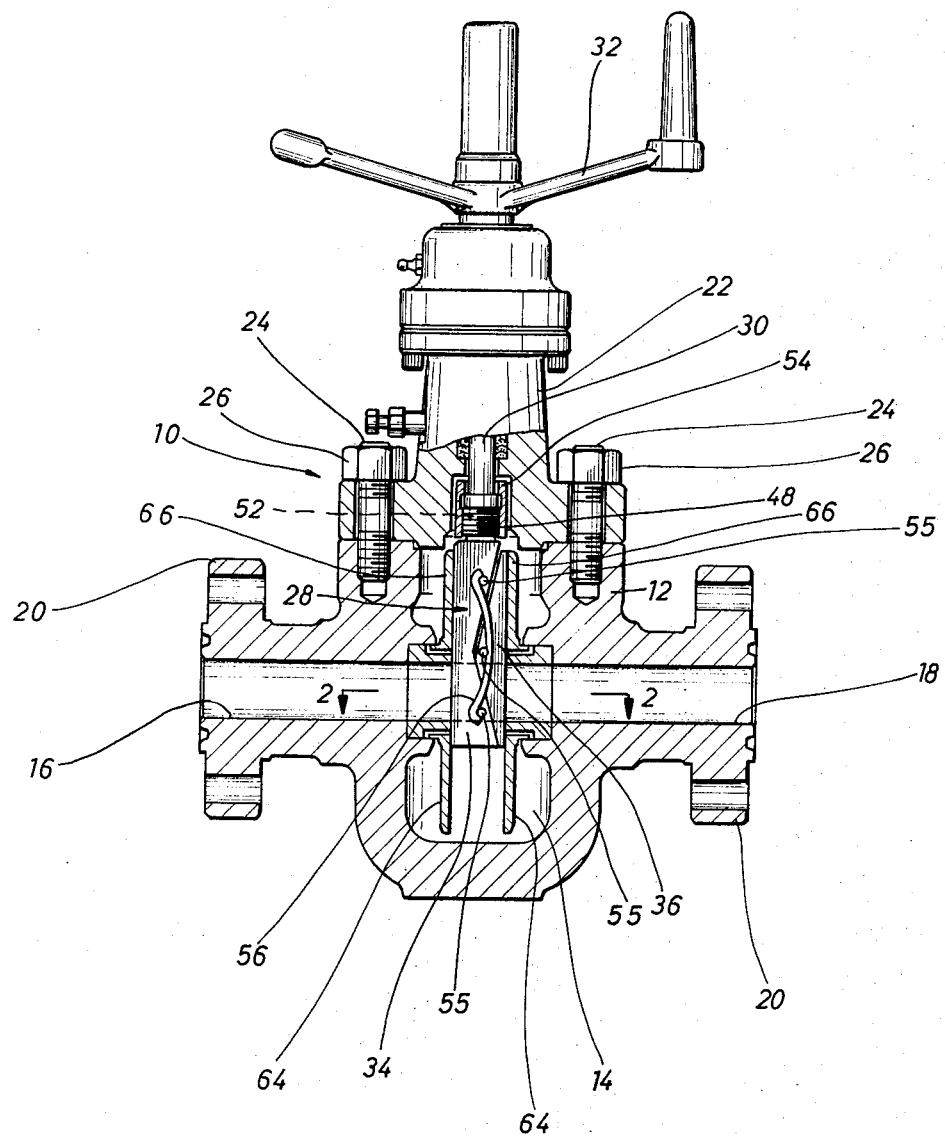
FIG. 1 is a sectional view, certain parts shown in elevation, of a gate valve structure embodying the present invention.
Figure 2:
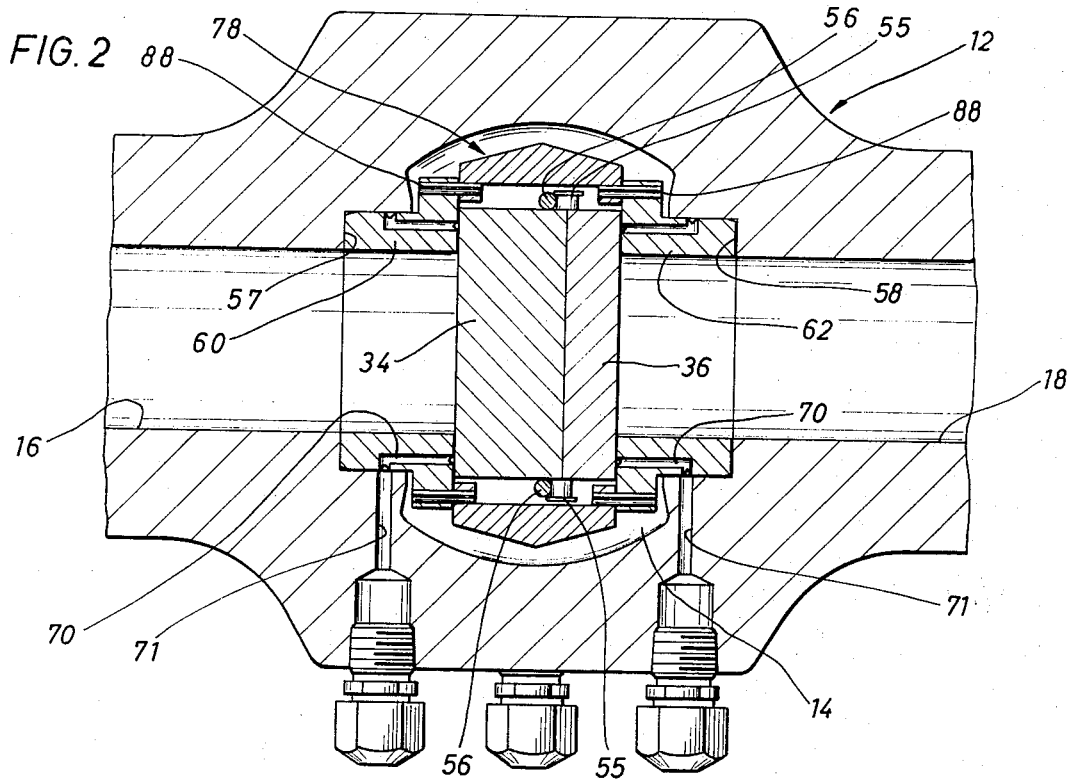
FIG. 2 is a longitudinal section looking generally along line 2—2 of FIG. 1 and showing spacer means forming the present invention positioned between the seat elements.
Figure 3:
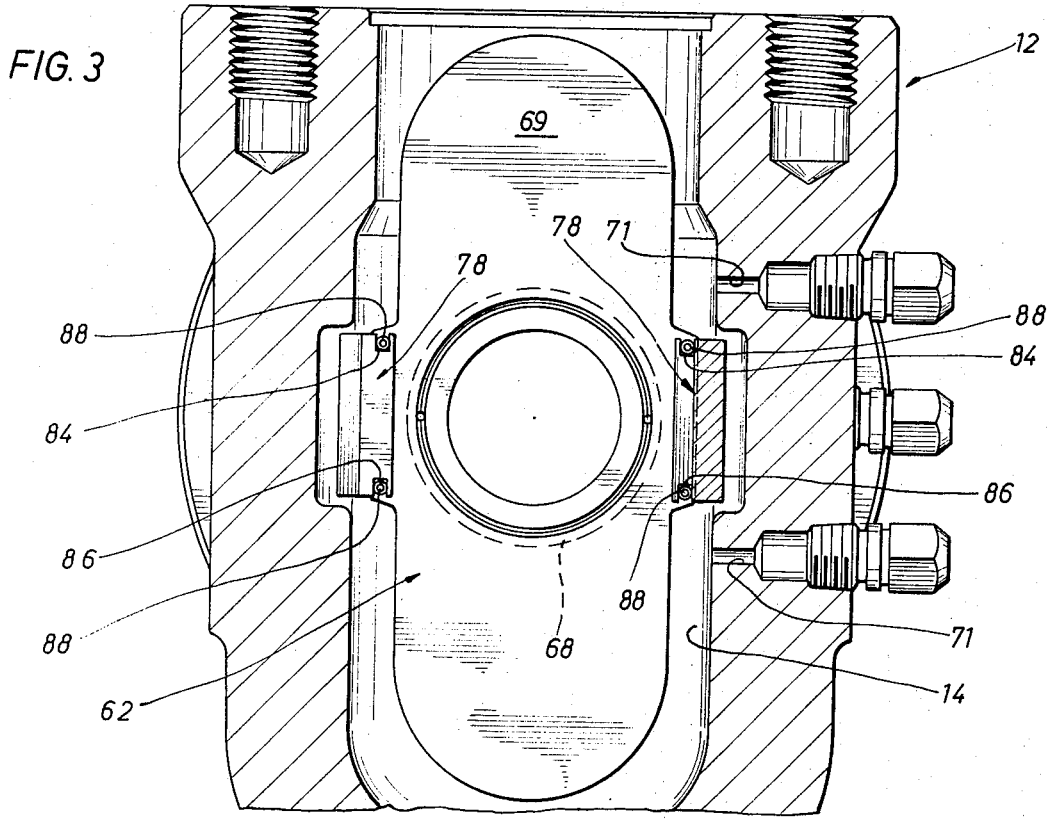
FIG. 3 is a transverse section of the seat elements in position and showing the spacer means in position between the seat elements.

Referring now to the drawings for a better understanding of the invention, a gate valve structure is generally indicated 10 and includes a valve body generally designated 12 having a valve chamber 14 therein. Inlet flow passage 16 and outlet flow passage 18 communicate with valve chamber 14. Flanges 20 on the ends of valve body 12 may be suitably connected to a connecting pipeline or other flow system as is well known in the art. A bonnet 22 is connected by studs 24 and nuts 26 to the upper end of body 12.

A gate valve assembly generally indicated 28 is mounted within chamber 14 for movement between open and closed positions relative to flow passages 16 and 18. A valve stem 30 is connected to gate assembly 28 and handwheel 32 is operatively connected to valve stem 30 for moving gate assembly 28 between closed and open positions upon rotation of handwheel 32 as is well known in the art.

Gate assembly 28 includes a gate element 34 and a segment 36. Gate element 34 and segment 36 are of complementary shape, segment 36 having a V-shaped face 38 while gate element 34 has a face 40 adapted to fit the V-shaped face 38 of segment 36 and upon relative longitudinal movement between gate element 34 and segment 36 to expand gate assembly 28 outwardly. Suitable ports 44 and 46 are provided in gate element 34 and segment 36 to align with flow passages 16 and 18 in an open position of gate assembly 28. Gate element 34 has a threaded projection 48 with an elongate slot 50 therein. Stem 30 has an elongate lug 52 fitting within slot 50. An internally threaded nut 54 is threaded on projection 48 and thereby connects stem 30 to gate element 34 for longitudinal movement. Lugs 55 extend from opposed sides of gate element 34 and segment 36 and springs 56 engaging lugs 55 continuously urge gate element 34 and segment 36 toward a collapsed or retracted position.

Formed in valve body 12 adjacent valve chamber 14 are annular recesses 57 and 58 which extend about respective flow passages 16 and 18. Identical seat elements 60 and 62 are pressed within recesses 57 and 58. Seat elements 60 and 62 are identical and each includes a lower skirt portion 64 and an upper skirt portion 66. A hub 68 forms a continuation of the adjacent flow passage 16 or 18. Each seat element 60, 62 has a smooth inner face 70 which is in sliding contact with the adjacent gate assembly. Upon gate assembly 28 reaching a lower closed position, the movement of gate element 34 urges segment 36 outwardly from the wedging action between faces 38 and 40 which expands the seat assembly against seat elements 60 and 62. Likewise, upon gate assembly 28 reaching an upper open position, gate element 34 will urge gate segment 36 outwardly to expand the gate assembly against seat elements 60, 62. However, upon movement of gate assembly 28 from the full open position or from the full closed position, springs 56 will move segment 36 to a collapsed or retracted position against gate element 34 to permit gate assembly 28 to move between open and closed positions between seat elements 60 and 62 without binding. Suitable lubricant ports 70 in seat elements 60, 62 communicate with lubricant bores 71 in body 12 and suitable lubricant fittings may be threaded in bores 71.

With a high differential pressure between the fluid pressure in the valve body and in the adjacent upstream flow passage, the pressurized fluid enters the recess behind the upstream seat element 60 as soon as gate element 34 and gate segment 36 move to a collapsed position to urge seat element 60 against gate assembly 28.

The present invention is directed to means to maintain a predetermined clearance between gate assembly 28 and seat elements 60, 62 even though a differential fluid pressure exists between the flow passage and the valve body which results in an urging of a seat element against the gate assembly when the gate assembly is in a collapsed position. Each seat element 60 and 62 has a pair of opposed extensions 72 and 74 with a pair of openings 76 in each extension. A spacer block generally indicated 78 has a main body 80 and a pair of shoulders 82. Shoulders 82 have upper and lower slots 84 and 86 therein. Spacer blocks 78 fit between extensions 72 and 74 on the opposed seat elements 60, 62 and suitable pins 88 fit within openings 76 and are received in slots 84 and 86 of spacer blocks 78 to hold spacer blocks 78 in abutting relation to extensions 72, 74 between opposed seat elements 60 and 62.

Spacer blocks 78 may be easily assembled within the valve chamber after seat elements 60, 62 have been inserted by first inserting pins 88 through lower openings 76. Then spacer blocks 78 may be lowered into position with grooves 86 receiving lower pins 88. Then, upper pins 88 may be driven inwardly to be received within upper grooves 84 thereby to retain spacer blocks 78 in position. Normally, spacer blocks 78 are maintained to tight abutting relation to the adjacent faces of seat elements 60 and 62.

Spacer blocks 78 maintain a minimum clearance between gate assembly 28 and seat elements 60, 62 in the fully collapsed position of gate assembly 28 and have a width preferably around 0.010 inch greater than gate assembly 28 in collapsed position. Widths between 0.005 inch and 0.050 inch greater than the width of gate assembly 28 are believed to be satisfactory. Thus, in the event upstream seat element 60 floats as a result of fluid pressure toward gate assembly 28, downstream seat elements 62 will likewise move the same distance as seat element 60 to maintain the predetermined clearance between gate assembly 28 and seat elements 60, 62.

What is claimed is:

1. A gate valve structure comprising a valve body having a valve chamber therein and inlet and outlet flow passages communicating with the valve chamber, an expanding valve assembly including a gate element and segment slidably mounted within the valve chamber for movement between open and closed positions of the gate valve structure with said gate element and segment expanding away from each other at the fully open and closed position, said gate element and segment having ports therethrough alignable with said flow passages in the open positions of the valve assembly, an annular recess in the valve body surrounding each flow passage and opening into the valve chamber, a seat element fitted within each recess, each seat element having a port therein aligned with the adjacent flow passage and a skirt extending from opposed sides of the associated port alongside the adjacent gate assembly, each skirt at least at a location adjacent the flow passage having opposed projections of a width greater than the width of the gate assembly, and a spacer extending alongside the gate assembly in a direction generally parallel to the longitudinal axis of the flow passages and positioned between facing projections on the seat elements to maintain a minimum clearance between the seat elements and gate assembly.

2. A gate valve structure as set forth in claim 1 wherein said spacer is a plate member fitting between and abutting the seat elements adjacent the flow passages.

3. A gate valve structure as set forth in claim 1 wherein said spacer has a width at least around 0.005 inch greater than the thickness of the adjacent gate assembly.

4. A gate valve structure as set forth in claim 1 wherein said spacer comprises a plate member fitting between and abutting facing projections on the seat elements, and connecting means between the projections and the spacer to hold the spacer in abutting position between the projections but permitting the associated seat element to move away from the spacer.

5. A gate valve structure as set forth in claim 4 wherein said connecting means comprises a pair of grooves in each spacer adjacent each of the associated projections, and pins mounted on the projections fitting within the grooves to hold the spacer in position.

* * * * *